United States Patent
Pai et al.

(10) Patent No.: US 12,261,767 B2
(45) Date of Patent: Mar. 25, 2025

(54) BEST PATH COMPUTATION OFFLOAD IN A NETWORK COMPUTING ENVIRONMENT

(71) Applicant: Arrcus Inc., San Jose, CA (US)

(72) Inventors: Nalinaksh Pai, San Ramon, CA (US); Feng Xu, San Jose, CA (US); Ebben Aries, Highlands Ranch, CO (US); Arthi Ayyangar, Los Altos, CA (US); Keyur Patel, San Jose, CA (US)

(73) Assignee: Arrcus Inc., San Jose, CA (US)

(*) Notice: Subject to any disclaimer, the term of this patent is extended or adjusted under 35 U.S.C. 154(b) by 667 days.

(21) Appl. No.: 17/400,929

(22) Filed: Aug. 12, 2021

(65) Prior Publication Data

US 2021/0377158 A1    Dec. 2, 2021

Related U.S. Application Data

(63) Continuation of application No. 16/672,964, filed on Nov. 4, 2019, now Pat. No. 11,121,963.

(51) Int. Cl.
| | |
|---|---|
| *H04L 45/24* | (2022.01) |
| *H04L 45/00* | (2022.01) |
| *H04L 45/122* | (2022.01) |
| *H04L 45/42* | (2022.01) |
| *H04L 45/58* | (2022.01) |

(52) U.S. Cl.
CPC ............ *H04L 45/24* (2013.01); *H04L 45/122* (2013.01); *H04L 45/42* (2013.01); *H04L 45/58* (2013.01); *H04L 45/70* (2013.01)

(58) Field of Classification Search
None
See application file for complete search history.

(56) References Cited

U.S. PATENT DOCUMENTS

| | | | | |
|---|---|---|---|---|
| 7,710,899 | B1 * | 5/2010 | Ward | H04L 45/04 370/254 |
| 8,953,437 | B1 * | 2/2015 | Tiruveedhula | H04L 45/50 370/389 |
| 11,121,963 | B2 * | 9/2021 | Pai | H04L 45/42 |
| 2008/0013551 | A1 | 1/2008 | Scholl | |

(Continued)

FOREIGN PATENT DOCUMENTS

WO    WO-2018166452 A1 * 9/2018 ............. H04L 45/02

OTHER PUBLICATIONS

D2 Rekhter Y Et Al A Border Gateway Protocol 4 (BGP-4); rfc4271.txt, Jan. 2006.

*Primary Examiner* — Jay L Vogel
(74) *Attorney, Agent, or Firm* — David R. Stevens; Stevens Law Group (57) ABSTRACT

Systems, methods, and devices for offloading best path computations in a networked computing environment. A method includes storing in memory, by a best path controller, a listing of a plurality of paths learnt by a device, wherein each of the plurality of paths is a route for transmitting data from the device to a destination device. The method includes receiving, by the best path controller, a message from the device. The method includes processing, by the best path controller, a best path computation to identify one or more best paths based on the message such that processing of the best path computation is offloaded from the device to the best path controller. The method includes sending the one or more best paths to the device.

18 Claims, 8 Drawing Sheets

(56) References Cited

U.S. PATENT DOCUMENTS

| | | |
|---|---|---|
| 2009/0198832 A1 | 8/2009 | Shah |
| 2010/0265956 A1 | 10/2010 | Li |
| 2012/0269198 A1* | 10/2012 | Patel .................... H04L 45/021 |
| | | 370/400 |
| 2013/0242717 A1* | 9/2013 | Fujii ...................... H04L 45/28 |
| | | 370/216 |
| 2016/0248663 A1 | 8/2016 | Patel |
| 2017/0346727 A1 | 11/2017 | Perrett |
| 2021/0083975 A1* | 3/2021 | Chunduri .............. H04L 45/121 |
| 2021/0120109 A1* | 4/2021 | Ranpise ................ G06F 16/285 |

* cited by examiner

BEST PATH COMPUTATION OFFLOAD IN A NETWORK COMPUTING ENVIRONMENT

RELATED APPLICATION

This application is a continuation of U.S. application Ser. No. 16/672,964, filed Nov. 4, 2019 and entitled "Best Path Computation Offload In A Network Computing Environment," which is hereby incorporated by reference in its entirety.

TECHNICAL FIELD

The disclosure relates to computing networks and particularly relates to best path computations for communications between networked devices.

BACKGROUND

Network computing is a means for multiple computers or nodes to work together and communicate with one another over a network. There exist wide area networks (WAN) and local area networks (LAN). Both wide and local area networks allow for interconnectivity between computers. Local area networks are commonly used for smaller, more localized networks that may be used in a home, business, school, and so forth. Wide area networks cover larger areas such as cities and can even allow computers in different nations to connect. Local area networks are typically faster and more secure than wide area networks, but wide area networks enable widespread connectivity. Local area networks are typically owned, controlled, and managed in-house by the organization where they are deployed, while wide area networks typically require two or more constituent local area networks to be connection over the public Internet or by way of a private connection established by a telecommunications provider.

Local and wide area networks enable computers to be connected to one another and transfer data and other information. For both local and wide area networks, there must be a means to determine a path by which data is passed from one compute instance to another compute instance. This is referred to as routing. Routing is the process of selecting a path for traffic in a network or between or across multiple networks. The routing process usually directs forwarding on the basis of routing tables which maintain a record of the routes to various network destinations. Routing tables may be specified by an administrator, learned by observing network traffic, or built with the assistance of routing protocols.

Small networks may use manually configured routing tables to determine how information should travel from one computer to another computer. A routing table may include a listing of "best paths" indicating the most efficient or most desirable paths between a starting computer and a final destination computer. Larger networks, including networks connected to the public Internet, may rely on complex topologies that can change rapidly such that the manual construction of routing tables is unfeasible. Dynamic routing attempts to solve this problem by constructing routing tables automatically based on information carried by routing protocols. Dynamic routing enables a network to act nearly autonomously in avoiding network failures and blockages. There exist multiple routing protocols that provide rules or instructions for determining best paths between networked device. Examples of dynamic routing protocols and algorithms include Routing Information Protocol (RIP), Open Shortest Path First (OSPF), Intermediate System-Intermediate System (IS-IS), and Border Gateway Protocol (BGP).

In some instances, path selection involves applying a routing metric to multiple routes to select or predict the best route. Most routing algorithms use only one network path at a time. Multiple path routing techniques enable the use of multiple alternative paths. In computer networks, a routing algorithm may be used to predict the best path between two compute instances. The routing algorithm may be based on multiple factors such as bandwidth, network delay, hop count, path cost, load, maximum transfer unit, reliability, and communication cost. The routing table stores a listing of the best paths. A topological database may store a list of the best paths and may further store additional information.

In some networks, routing is complicated by the fact that no single entity is responsible for selecting best paths. Instead, multiple entities are involved in selecting best paths or event portions of a single path. In the context of computer networking over the Internet, the Internet is partitioned into autonomous systems (AS) such as Internet Service Providers (ISPs). Each autonomous system controls routes involving its network. Autonomous system-level paths are selected based on the Border Gateway Protocol (BGP). Each autonomous system-level path includes a sequence of autonomous systems through which packets of information flow to travel from one compute instance to another compute instance. Each autonomous system may have multiple paths from which to choose that are offered by neighboring autonomous systems.

In the new age of software-defined networks, there is an increased demand for greater ability to control and customize behaviors within a network. The BGP was designed to facilitate the use of policies to control selection of best paths, attributes, and advertisements. However, the best path algorithm itself is standardized and fixed in nature and there remains a demand to implement further customizability on top of the BGP.

In light of the foregoing, disclosed herein are systems, methods, and devices for offloading best path decision making to an external entity that is free to implement a custom algorithm for identifying a most desirable path between one compute instance and another computer instance.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Disclosed herein are systems, methods, and devices for improved routing for data transmission. In the age of software-defined networks, there is an increased demand for greater ability to control and customize behaviors within a computer network. Disclosed herein are systems, methods, and devices for offloading best path decision making to an external entity. The external entity is then free to implement a custom algorithm to identify the most desirable path to transfer data from one compute instance to another compute instance across the Internet.

Embodiments of the disclosure may be deployed to identify the best path for transmitting data from a first router to a destination router across the Internet. An embodiment of the disclosure includes a best path controller (BPC) that serves as an external entity to the Border Gateway Protocol (BGP) standardized algorithm for determining routing paths. The best path controller may be co-located on the same host running the BGP. Alternatively, the best path controller may be located on a different host and serve one or more BGP instances.

A BGP instance is a software daemon for routing information in a network. The BGP instance may run on a switch, router, or in a virtual environment (e.g., virtual machine on a hosting device) that emulates a switch or router. At a high level, the BGP instance sends all the paths it has learnt for a prefix to the best path controller. The best path controller responds with a set of best paths from amongst those paths. The best path controller is permitted to modify the next-hop and attributes for any of the paths. Once the best paths are received, the BGP instance updates the local Routing Information Base (RIB) and advertises the best path out to its neighbors.

In an embodiment, a method is performed by a best path controller. The method enables the offloading of best path computations from individual devices (such as routers and switches), where BGP instances run, to the best path controller. The method includes storing, by a best path controller, a listing of a plurality of paths learnt by a device, wherein the paths are routes for transmitting information from the device to a destination device. The method includes receiving, by the best path controller, a message from the device. In an embodiment, the message is a Network Layer Reachability Information (NLRI) message. The method includes processing, by the best path controller, a best path computation to identify one or more best paths based on the message. The method includes sending the one or more best paths to the device such that processing of the best path computation is offloaded from the device to the best path controller.

A switch (may alternatively be referred to as a switching hub, bridging hub, or MAC bridge) creates a network. Most internal networks use switches to connect computers, printers, phones, camera, lights, and servers in a building or campus. A switch serves as a controller that enables networked devices to talk to each other efficiently. Switches connect devices on a computer network by using packet switching to receive, process, and forward data to the destination device. A network switch is a multiport network bridge that uses hardware addresses to process and forward data at a data link layer (layer 2) of the Open Systems Interconnection (OSI) model. Some switches can also process data at the network layer (layer 3) by additionally incorporating routing functionality. Such switches are commonly known as layer-3 switches or multilayer switches.

A router connects networks. Switches and routers perform similar functions, but each has its own distinct function to perform on a network. A router is a networking device that forwards data packets between computer networks. Routers perform the traffic directing functions on the Internet. Data sent through the Internet, such as a web page, email, or other form of information, is sent in the form of a data packet. A packet is typically forwarded from one router to another router through the networks that constitute an Internetwork (e.g., the Internet) until the packet reaches its destination node. Routers are connected to two or more data lines from different networks. When a data packet comes in on one of the lines, the router reads the network address information in the packet to determine the ultimate destination. Then, using information in the router's routing table or routing policy, the router directs the packet to the next network on its journey. A BGP speaker is a router enabled with the Border Gateway Protocol (BGP).

Route control is a type of network management that aims to improve Internet connectivity and reduce bandwidth cost and overall Internetwork operations. Some route control services include a suite of hardware-based and software-based products and services that work together to improve overall Internet performance and fine tune the use of available Internet bandwidth at minimal cost. Route control can be successful in scenarios where a network or autonomous system is sourcing Internet bandwidth from multiple providers. Route control can aid in the selection of the most optimal path for data transmission.

Some network communication systems are large, enterprise-level networks with thousands of processing nodes. The thousands of processing nodes share bandwidth from multiple Internet Service Providers (ISPs) and can process significant Internet traffic. Such systems can be extremely complex and must be properly configured to result in acceptable Internet performance. If the systems are not properly configured for optimal data transmission, the speed of Internet access can decrease, and the system can experience high bandwidth consumption and traffic. To counteract this problem, a set of services may be implemented to remove or reduce these concerns. This set of services may be referred to as routing control.

An embodiment of a routing control mechanism is composed of hardware and software. The routing control mechanism monitors all outgoing traffic through its connection with an Internet Service Provider (ISP). The routing control mechanism aids in selecting the best path for efficient transmission of data. The routing control mechanism may calculate the performance and efficiency of all ISPs and select only those ISPs that have performed optimally in applicable areas. Route control devices can be configured according to defined parameters pertaining to cost, performance, and bandwidth.

A known algorithm for determining the best path for the transmission of data is referred to as the Border Gateway Protocol (BGP). BGP is a path-vector protocol that provides routing information for autonomous systems on the Internet. When BGP is configured incorrectly, it can cause severe availability and security issues. Further, modified BGP route information can permit attackers to redirect large blocks of traffic so the traffic travels to certain routers before reaching its intended destination. The BGP best path algorithm can be implemented to determine the best path to install in an Internet Protocol (IP) routing table for traffic forwarding. BGP routers may be configured to receive multiple paths to the same destination.

The BGP best path algorithm assigns a first valid path as the current best path. The BGP best path algorithm compares the best path with the next path in the list until the BGP reaches the end of the list of valid paths. The list provides the rules that are used to determine the best path. For example, the list may include an indication that the path with the highest weight is preferred, the path without a local preference is preferred, the path that was locally originated by way of a network or aggregate BGP is preferred, a shortest path is preferred, a path with the lowest multi-exit discriminator is preferred, and so forth. The BGP best path selection process can be customized.

In the context of BGP routing, each routing domain is known as an autonomous system (AS). BGP assists in selecting a path through the Internet to connect two routing domains. BGP typically selects a route that traverses the least number of autonomous systems, referred to as the shortest AS path. In an embodiment, once BGP is enabled, a router will pull a list of Internet routes from BGP neighbors which may be ISPs. BGP will then scrutinize the list to find routes with the shortest AS paths. These routes may be entered in the router's routing table. Generally, a router will choose the shortest path to an AS. BGP uses path attributes to determine how to route traffic to specific networks.

However, there are numerous known issues with BGP. In some instances, there are significant issues with routing table growth. For example, if a user decides to deaggregate a network that was a single/16 network, the user may potentially start advertising new routes. Every router on the Internet will receive each new route when this happens. Users may be pressured to aggregate or combine multiple routes into a single advertisement. Further, there is a concern that a user will "advertise the Internet." If a large ISP's customer chooses to advertise everything, and the ISP accepts the routes, all of the Internet's traffic may be sent to the small customer's AS. Further, BGP has a mechanism to hold down routes that appear to be unreliable. Routes that flap, or come and go, typically are identified as not being reliable. If routes flap frequently, the load on all Internet routes may increase due to the processing of updates every time a route disappears and reappears.

Additionally, in the age of software-defined networks, operators demand greater ability to control and customize behaviors of networks. The BGP routing protocol was designed to facility the use of policies to control selection of best paths, attributes, and advertisements. However, the best path algorithm itself is standardized and fixed in nature. In light of the foregoing, disclosed herein are systems, methods, devices, and means for BGP to offload the best path decision making to an external entity which is then free to implement a custom algorithm that fits the purpose. The external entity, herein referred to as the Best Path Controller (BPC) may be collocated on the same host that BGP is running or may be located on a different host and serve one or more BGP instances.

In an embodiment, a BGP instance may take the form of a BGP speaker running on a switch or a router. At a high level, the BGP instance sends a plurality of paths it has learnt for a prefix to the best path controller. The best patch controller responds back with a set of best paths from amongst those paths. The best path controller is permitted to modify the next-hop and attributes for any of the paths. After the best path is received, the BGP instance updates the local Routing Information Base (RIB) and advertises the best path to applicable neighbors.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems and methods for producing an image in a light deficient environment are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Figure 1:
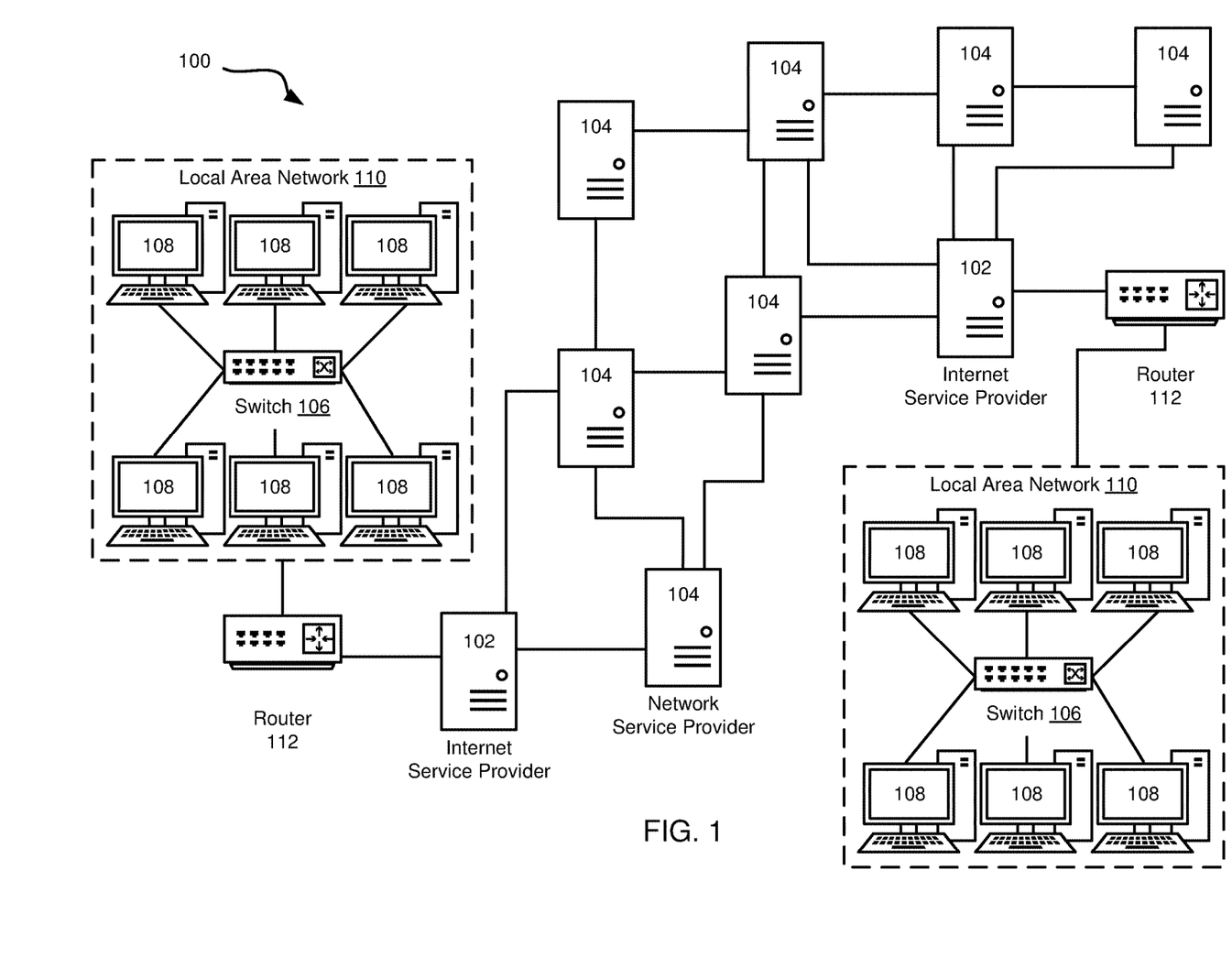
FIG. 1 is a schematic diagram of a system of networked devices communicating over the Internet.

Referring now to the figures, FIG. 1 illustrates a schematic diagram of a system 100 for connecting devices to the Internet. The system 100 includes multiple local area network 110 connected by a switch 106. Each of the multiple local area networks 110 can be connected to each other over the public Internet by way of a router 112. In the example system 100 illustrated in FIG. 1, there are two local area networks 110. However, it should be appreciated that there may be many local area networks 110 connected to one another over the public Internet. Each local area network 110 includes multiple computing devices 108 connected to each other by way of a switch 106. The multiple computing devices 108 may include, for example, desktop computers, laptops, printers, servers, and so forth. The local area network 110 can communicate with other networks over the public Internet by way of a router 112. The router 112 connects multiple networks to each other. The router 112 is connected to an Internet service provider 102. The Internet service provider 102 is connected to one or more network service providers 104. The network service providers 104 are in communication with other local network service providers 104 as shown in FIG. 1.

The switch 106 connects devices in the local area network 110 by using packet switching to receive, process, and forward data to a destination device. The switch 106 can be configured to, for example, receive data from a computer that is destined for a printer. The switch 106 can receive the data, process the data, and send the data to the printer. The switch 106 may be a layer-1 switch, a layer-2 switch, a layer-3 switch, a layer-4 switch, a layer-7 switch, and so forth. A layer-1 network device transfers data but does not manage any of the traffic coming through it. An example of a layer-1 network device is an Ethernet hub. A layer-2 network device is a multiport device that uses hardware addresses to process and forward data at the data link layer (layer 2). A layer-3 switch can perform some or all of the functions normally performed by a router. However, some network switches are limited to supporting a single type of physical network, typically Ethernet, whereas a router may support different kinds of physical networks on different ports.

The router 112 is a networking device that forwards data packets between computer networks. In the example system 100 shown in FIG. 1, the routers 112 are forwarding data packets between local area networks 110. However, the router 112 is not necessarily applied to forwarding data packets between local area networks 110 and may be used for forwarding data packets between wide area networks and so forth. The router 112 performs traffic direction functions on the Internet. The router 112 may have interfaces for different types of physical layer connections, such as copper cables, fiber optic, or wireless transmission. The router 112 can support different network layer transmission standards. Each network interface is used to enable data packets to be forwarded from one transmission system to another. Routers 112 may also be used to connect two or more logical groups of computer devices known as subnets, each with a different network prefix. The router 112 can provide connectivity within an enterprise, between enterprises and the Internet, or between Internet service providers' networks as shown in FIG. 1. Some routers 112 are configured to interconnecting various Internet service providers or may be used in large enterprise networks. Smaller routers 112 typically provide connectivity for home and office networks to the Internet. The router 112 shown in FIG. 1 may represent any suitable router for network transmissions such as an edge router, subscriber edge router, inter-provider border router, core router, Internet backbone, port forwarding, voice/data/fax/video processing routers, and so forth.

The Internet service provider (ISP) 102 is an organization that provides services for accessing, using, or participating in the Internet. The ISP 102 may be organized in various forms, such as commercial, community-owned, non-profit, or privately owned. Internet services typically provided by ISPs 102 include Internet access, Internet transit, domain name registration, web hosting, Usenet service, and colocation. The ISPs 102 shown in FIG. 1 may represent any suitable ISPs such as hosting ISPs, transit ISPs, virtual ISPs, free ISPs, wireless ISPs, and so forth.

The network service provider (NSP) 104 is an organization that provides bandwidth or network access by providing direct Internet backbone access to Internet service providers. Network service providers may provide access to network access points (NAPs). Network service providers 104 are sometimes referred to as backbone providers or Internet providers. Network service providers 104 may include telecommunication companies, data carriers, wireless communication providers, Internet service providers, and cable television operators offering high-speed Internet access. Network service providers 104 can also include information technology companies.

It should be appreciated that the system 100 illustrated in FIG. 1 is exemplary only and that many different configurations and systems may be created for transmitting data between networks and computing devices. Because there is a great deal of customizability in network formation, there is a desire to create greater customizability in determining the best path for transmitting data between computers or between networks. In light of the foregoing, disclosed herein are systems, methods, and devices for offloading best path computations to an external device to enable greater customizability in determining a best path algorithm that is well suited to a certain grouping of computers or a certain enterprise.

Figure 2:
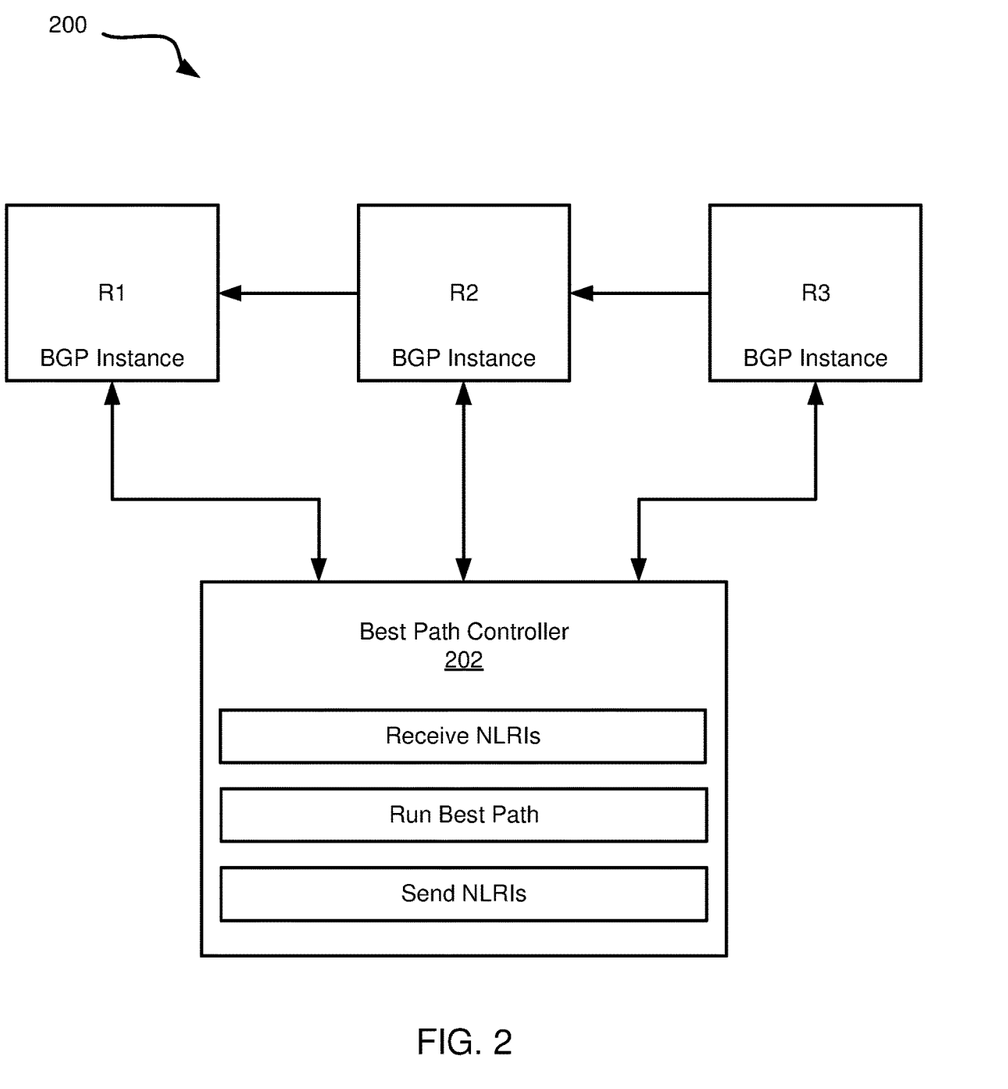
FIG. 2 is a schematic diagram of a system for offloading best path computations from individual devices to a best path controller.

FIG. 2 illustrates a schematic diagram of system 200 for making best path determinations between devices. The system 200 includes multiple BGP instances R1, R2, R3 for transmitting information. Each of the multiple BGP instances R1, R2, R3 may be a switch 106 or a router 112. Each of the multiple BGP instances R1, R2, R3 is running the Border Gateway Protocol (BGP) for routing traffic. The multiple BGP instances R1, R2, R3 are each in communication with a best path controller 202. The best path controller 202 is configured to continuously receive a plurality of BGP Network Layer Reachability Information (NLRI) messages from each of the BGP instances, run best path calculations, and send messages of the NLRIs with best path calculation result to each of the BGP instances R1, R2, and R3. In an embodiment of the disclosure, the best path controller 202 can be applied to either of a switch 106 or a router 112. This provides enhanced flexibility so that a single software package for a best path controller 202 is applicable to multiple types of hardware.

Figure 3:
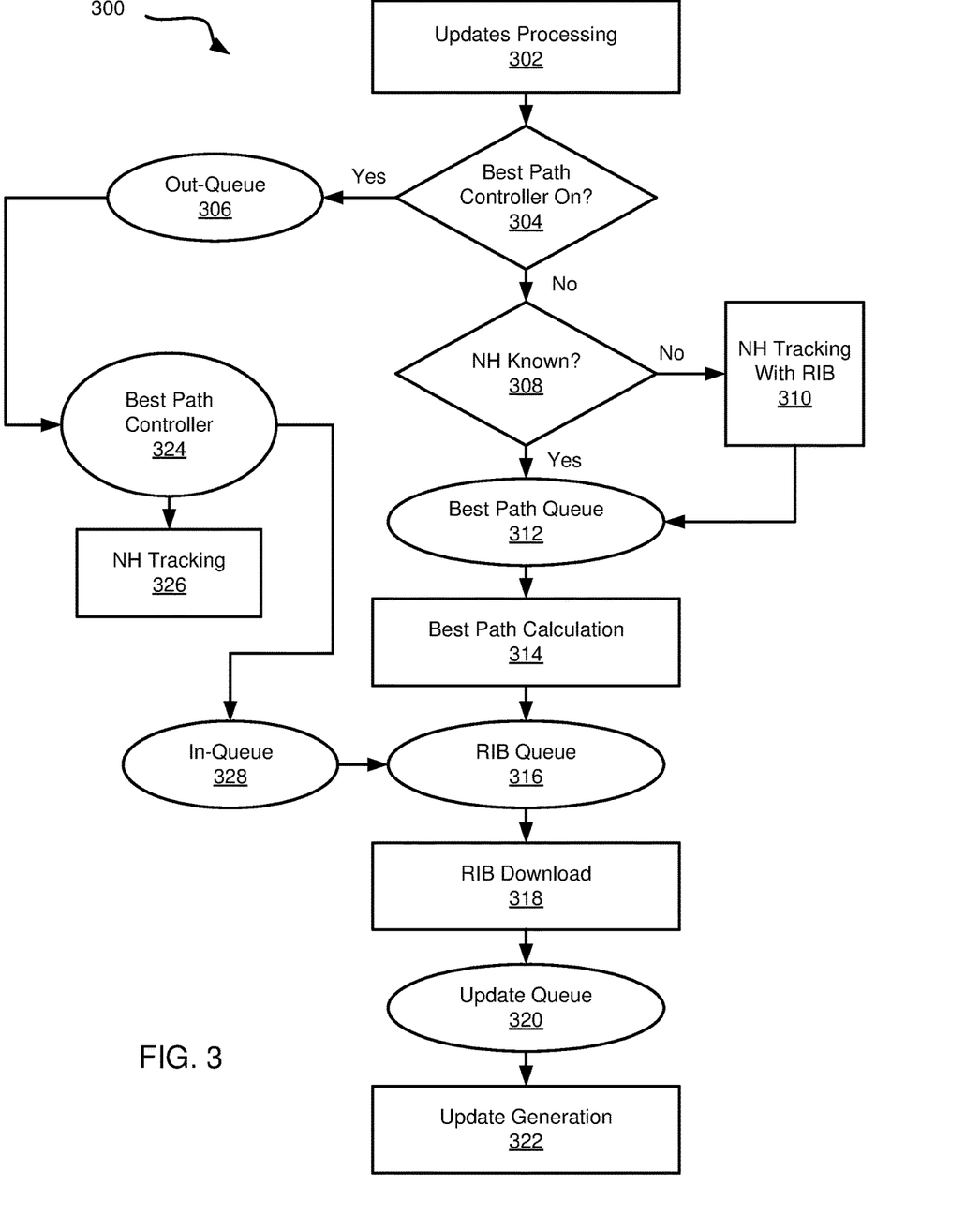
FIG. 3 is a schematic diagram of a process flow that may be performed by a state machine within a device running the Border Gateway Protocol (BGP)

FIG. 3 illustrates a schematic diagram of a process flow 300 that may be performed by a state machine within a BGP instance. The process flow 300 includes multiple queues for route processing. As received from an established neighbor, a BGP NLRI may be created and first added to a best path queue for best path computation. The BGP NLRI may be moved to a Routing Information Base (RIB) queue before being queued up for update generation and advertisement.

In the process flow 300, once BGP update messages with NLRIs are received and processed at 302, a determination is made at 304 whether the best path controller (BPC) is enabled. If the best path controller is on, the BGP NLRIs are pushed to the out-queue at 306 which channels towards the best path controller 324. The best path controller may need the assistance of next hop (NH) tracking at 326. In next hop tracking, the BGP uses services of the RIB to track reachability and metrics for each next hop. The RIB notifies BGP whenever these attributes change. BGP can use the tracking results to re-compute a new set of best paths. Once the best path computation is complete, the best path controller pushes the BGP NLRIs with their respective best paths back to the BGP instance via the in-queue at 328, which eventually moves the NLRIs to the RIB queue at 316 for subsequent processing.

If the determination at 304 indicates that the best path controller is off, then a determination is made at 308 whether the next hop has already been tracked. If the next hop is not known, then the BGP NLRIs will only be pushed to the best path queue 312 after next hop tracking with RIB 310. If the determination at 308 indicates that the next hop is known, then the BGP NLRIs are directly pushed to the best path queue 312 for best path calculation at 314. The resultant best paths are pushed to the RIB queue 316.

Further, the RIB download 318 is done on items in the RIB queue 316 before they are transferred to an update queue 320. At the end, update generation 322 operation is performed.

New queues may be introduced to the process flow 300 to integrate with a best path controller. The best path out-queue streams out the BGP NLRIs, which are marked for best path pending, to the best path controller. The best path selection results are returned to the BGP instance by way of a best path in-queue where NLRIs are marked best path complete.

A connection to the best path controller can be established over any reliable transport. Examples include gRPC (Remote Procedure Call), HTTP (Hyper Text Transfer Protocol), or a custom IPC (inter-process communication). The message format for the streams can be defined using binary formats such as Protocol Buffers (Protobuf), Thrift Protocol, or text format such as JSON (JavaScript Object Notation) and XML (eXtensible Markup Language). In an embodiment, the BGP instance and best path controller implementations must agree on the transport and the format.

In an embodiment, a BGP instance learns NLRIs from BGP neighbors. Instead of locally computing the best path for an NLRI, the BGP instance sends a message containing the NLRI and all paths learnt so far and their attributes to the best path controller. This message may be transmitted when an NLRI is learnt for the first time or whenever there is a change to the set of paths for that NLRI. The best path controller is expected to send back the best path computation result for the NLRI identifying one or more paths to be the best path. In addition, the best path controller may use the result message to update the attributes or the next hope of any of the paths. The BGP instance holds the NLRI in a best path queue while waiting for the reply from the best path controller. Once the result message is received from the best path controller, the BGP instance de-queues the NLRI from the best path queue and re-queues the NLRI to either a RIB installation queue if the NLRI needs to be installed in RIB or to an update generation queue for announcing it to BGP neighbors.

To ensure high throughput, the BGP instance may send the NLRI messages to best path controller in an asynchronous fashion. The BGP instance might not wait for the result to come back before sending an additional message for a same NLRI. Therefore, it is possible for multiple messages to be in flight for the same NLRIs. Each NLRI message includes a version number field which is guaranteed to be a unique identification across all messages received from a BGP instance. In an instance where the best path controller receives multiple messages from the same BGP instance for the same NLRI in quick succession, the best path controller can choose to send back a result for the latest message received for that NLRI. The NLRI message includes a version number that can be used to identify the latest message. The BGP instance expects the best path controller to send back a result for the latest version of that NLRI. Until such a message is received, the BGP instance keeps the advertisement and other processing for that NLRI pending.

The best path controller can also send result messages in an unsolicited fashion. In such an embodiment, the best path controller sends a result message not in response to an NLRI message sent by a BGP instance. This may be useful in an instance where a policy change requires the best path to be recomputed and pushed out in a proactive fashion. In this case, the best path controller must include the latest version number of the NLRI in the result message.

In addition to the best path computation messages, the best path controller may also serve as a consumer of next-hop reachability changes. When the reachability parameters of a next-hop corresponding to the best path changes, the best path controller may recompute a new best path and push the new best path to a BGP instance. The next-hop tracking is a registration service typically provided by RIB whereby the best path controller can register one or more next-hops the best path controller is interested in.

In an embodiment, the best path function is running in a separate process. In such an embodiment, it is important to handle failures and restarts of both the best path controller and the BGP instance. To handle these scenarios, implementations may resort to graceful restart mechanisms as described herein. When the BGP instance restarts, the best path controller retains state previously learnt from that peer. Upon detecting that the BGP instance has restarted either through transport disconnection or explicit signaling, the best path controller marks all information learnt from that BGP instance as stale. Once the BGP instance relearns NLRIs from its neighboring BGP instances, the BGP instance resends the NLRIs to the best path controller. The best path controller sends back the result messages as usual. In addition, the best path controller marks the newly received routes as "fresh." Once the BGP instance has sent all NLRIs as indicated by an explicit End-of-RIB (EoR) marker or a timer, the best path controller purges all NLRIs still marked as stale.

The aforementioned embodiment also applies to a scenario in which the best path controller crashes and restarts. In this scenario, the BGP instance retains the best paths previously computed by the best path controller. Once the best path controller restarts, the BGP instance would mark all best paths as stale and resend the NLRIs and their paths to the best path controller. Upon receiving the best path results, the BGP instance updates the corresponding entries marking them as "fresh." Once the BGP instance has received results for all NLRIs, the BGP instance purges the best paths that are still marked as stale.

Figure 4:
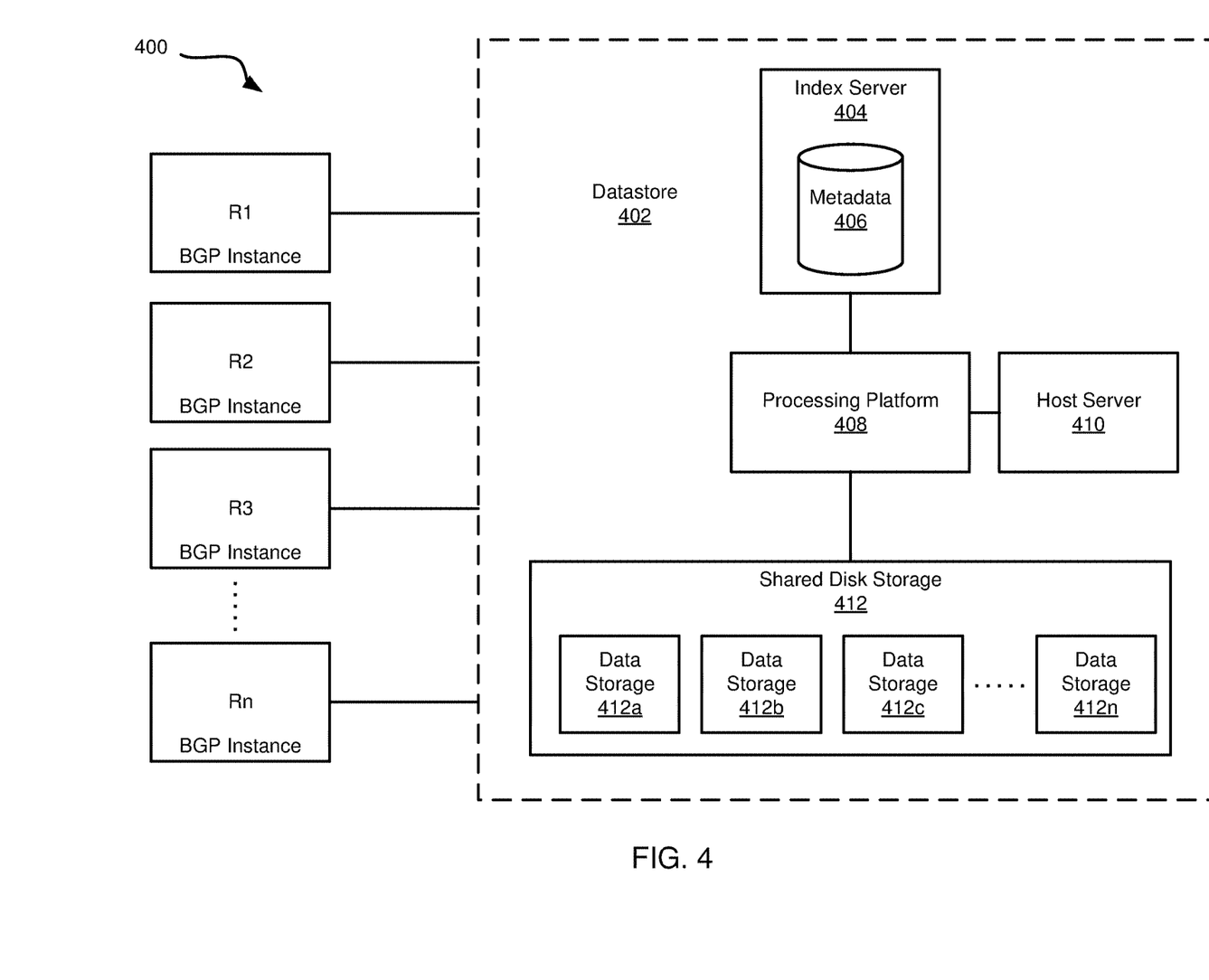
FIG. 4 is a schematic diagram of a system for offloading storage of best path information to a datastore.

FIG. 4 is a schematic diagram of a system 400 for offloading storage of best path computations and routes to a datastore 402. The system includes a datastore 402 in communication with multiple BGP instances R1, R2, R3, Rn. The datastore 402 includes an index server 404 in communication with metadata 406. The metadata 406 provides an indication of where certain data is located within shared disk storage 412. The shared disk storage 412 includes a plurality of data storage devices 412a, 412b, 412c, 412n. The index server 404 is in communication with a processing platform 408 and the processing platform 408 has access to the shared disk storage 412. The index server 404 is configured to provide an indication to the processing platform 408 of where certain data is located in the shared disk storage 412. The index server 404 makes this determination based on the metadata 406. The datastore 402 includes a host server 410 in communication with the processing platform 408. The host server 410 enables the processing platform 408 to write to the shared disk storage 412 by updating, adding, or deleting information in the shared disk storage 412. The processing platform 408 may include a plurality of hosts each comprising a processor and cache storage. Each of the hosts can be configured to read and write information in the shared disk storage 412.

Figure 5:
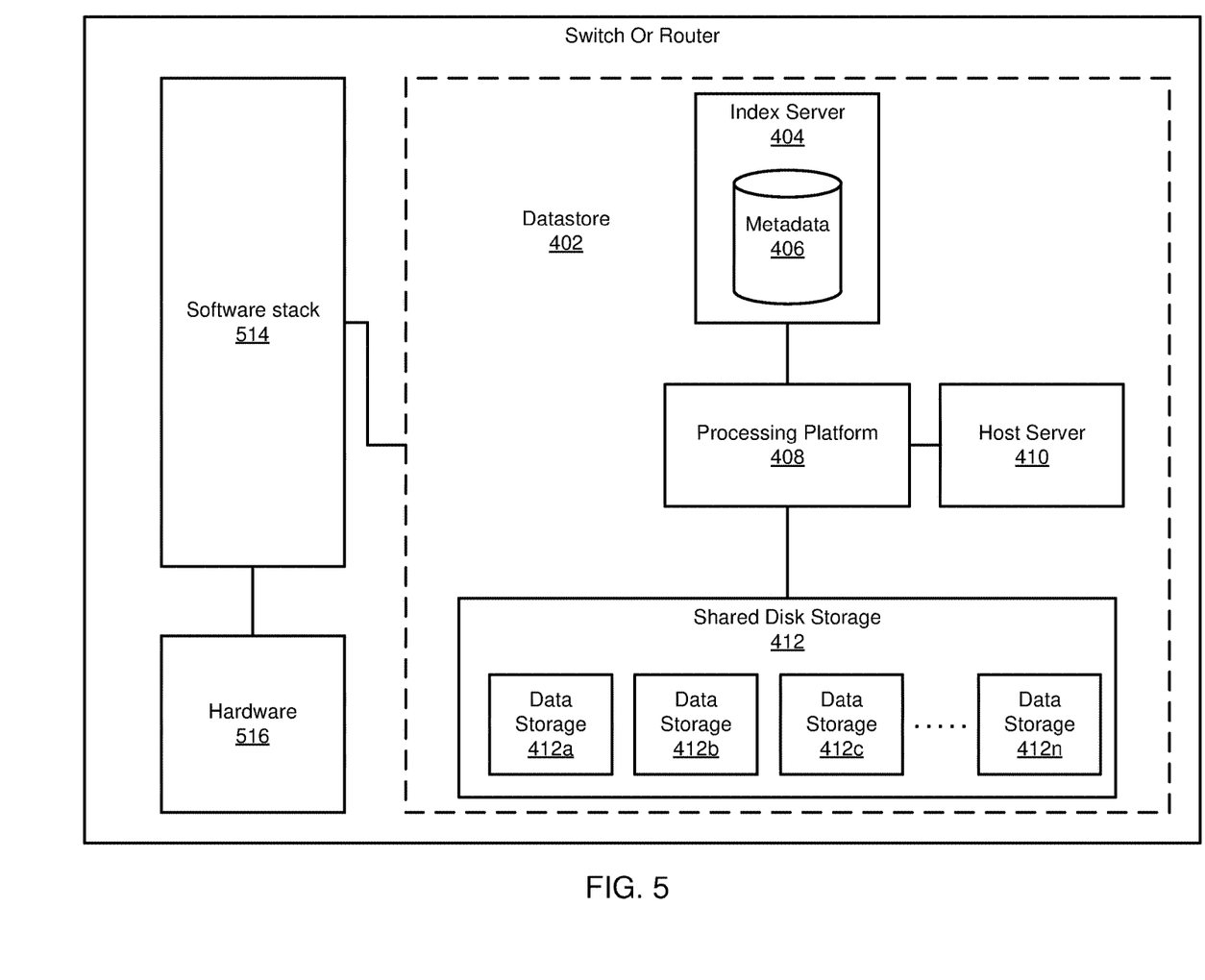
FIG. 5 is a schematic diagram of a system for offloading storage of best path information to a datastore.

FIG. 5 illustrates an embodiment wherein information is offloaded to a datastore 402 and the datastore 402 is local to a switch or router. The switch or router further includes hardware 516 and a software stack 514. The hardware 516 provides a physical connection that enables the transmission of data packets between computers or networks. The software stack 514 includes instructions to be implemented by a processor or hardware 516 for determining best paths and forwarding data packets along the best path for its destination device.

Figure 6:
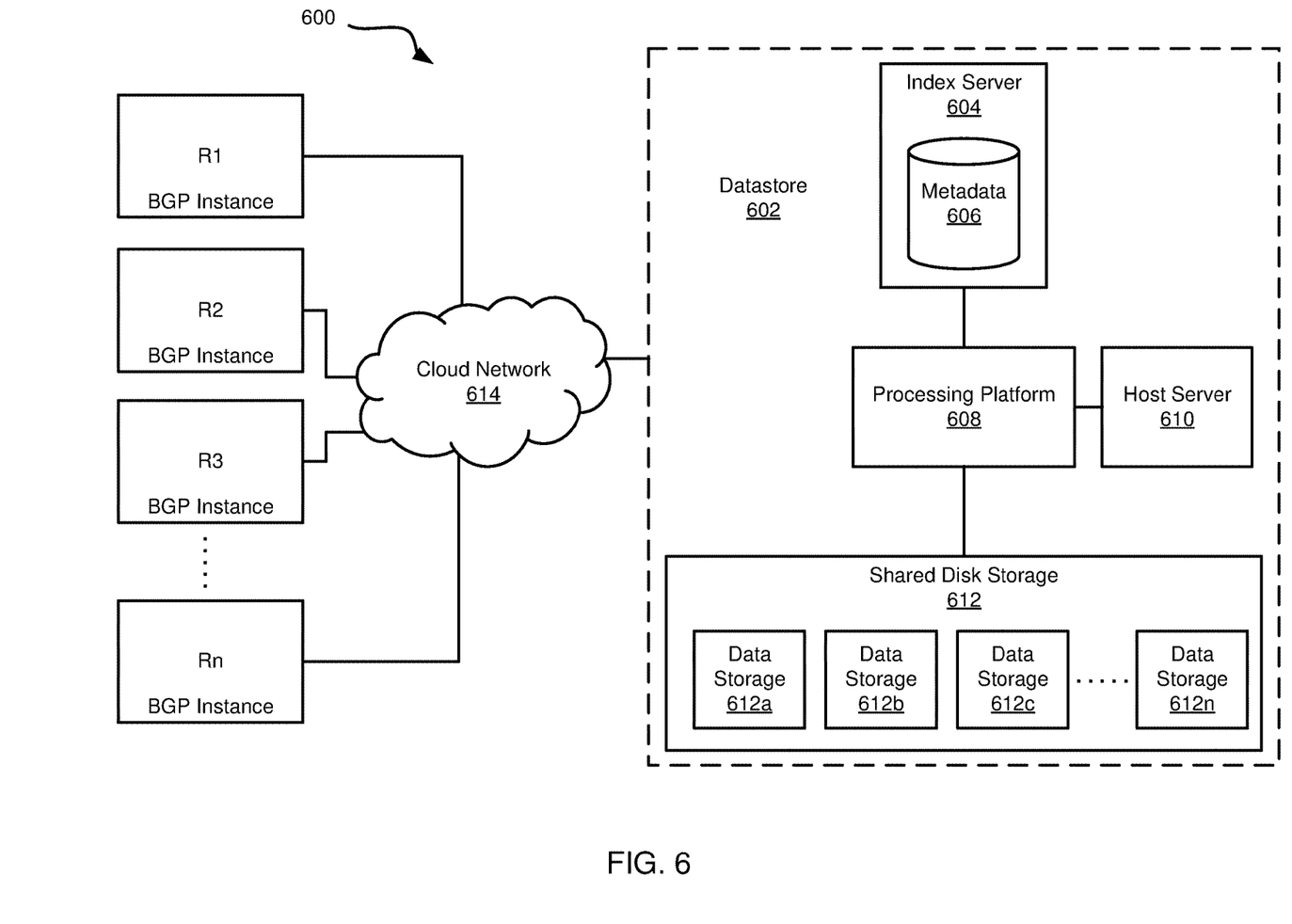
FIG. 6 is a schematic diagram of a system for offloading storage of best path information to a datastore.

FIG. 6 illustrates an embodiment wherein information is offloaded to a datastore 402 and the datastore 402 is accessible over a cloud network 614. In an embodiment, the datastore 602 is a cloud-based database that is accessible by multiple BGP instances R1, R2, R3, Rn.

Figure 7:
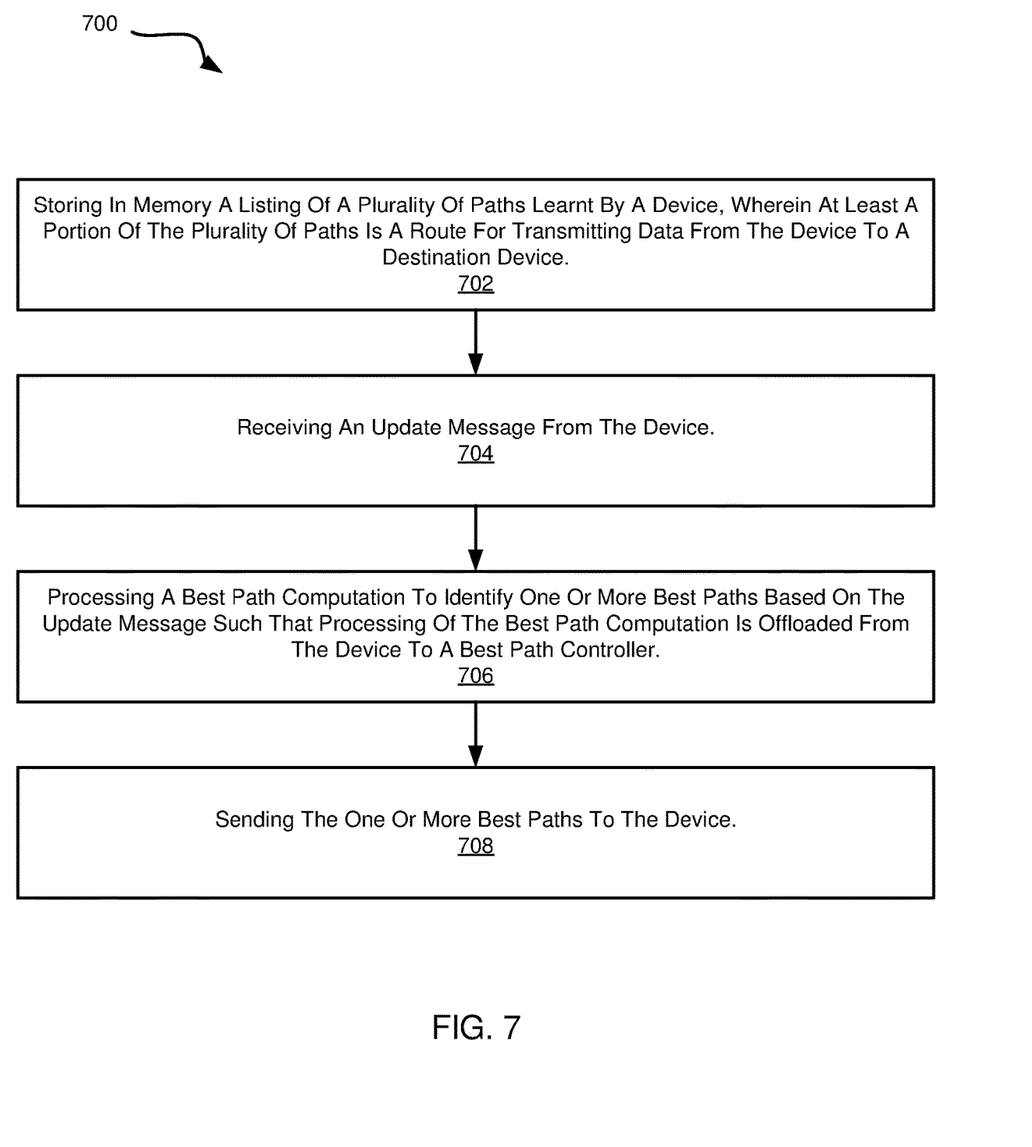
FIG. 7 is a flow chart block diagram of a method for offloading bath computations to a best path controller.

FIG. 7 is a schematic block diagram of a method 700 for offloading best path computations to a best path controller. The method 700 can be performed by a best path controller 202 as discussed herein. The best path controller 202 may be in communication with one or more devices for transmitting data to a destination device. The one or more devices may be BGP instances such as routers 112 or switches 106. The best path controller 202 may be located locally within one or more devices or the best path controller 202 may be external to each of the one or more devices.

The method 700 begins and the best path controller 202 stores at 702 a listing of a plurality of NLRIs learnt by a device, wherein the NLRIs include routes for transmitting data from the device to a destination device. The listing of the plurality of NLRIs may include all NLRIs learnt by the device, all non-stale NLRIs used by the device, NLRIs pertaining to the device and to other devices, less than all NLRIs learnt by the device, and so forth. The method 700 continues and the best path controller 202 receives at 704 an update message from the device. The update message may include a Network Layer Reachability Information (NLRI) message exchanged between BGP router and the best path controller 202. The NLRI may include a length and a prefix. The method 700 continues and the best path controller 202 processes at 706 a best path computation to identify one or more best paths based on the update message such that processing of the best path computation is offloaded from the device to the best path controller. The one or more best paths may be different or the same as the best paths stored in the listing of paths learnt by the device. The method 700 continues and the best path controller 202 sends at 706 the one or more best paths to the device.

Figure 8:
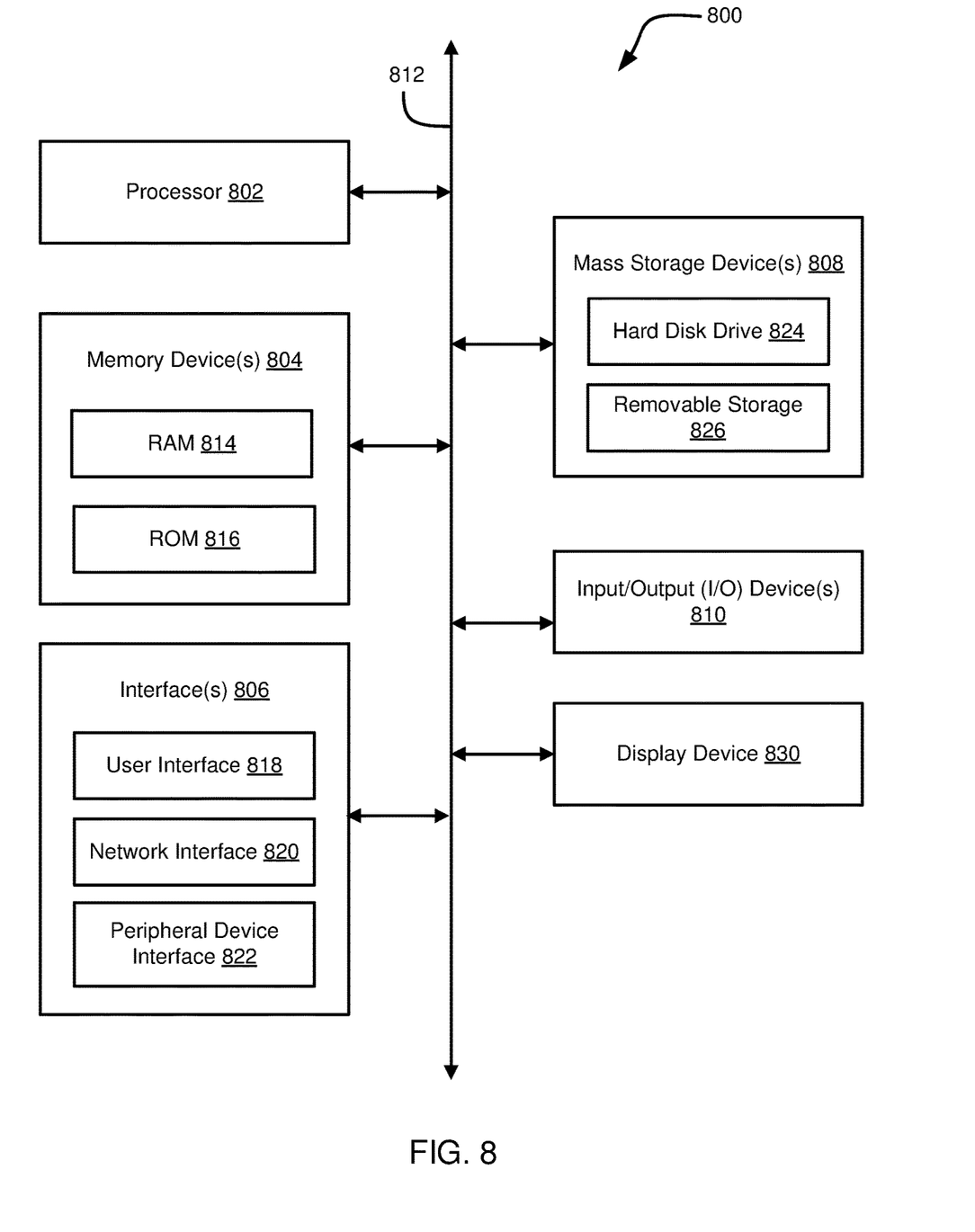
FIG. 8 is a schematic diagram illustrating components of an example computing device.

Referring now to FIG. 8, a block diagram of an example computing device 800 is illustrated. Computing device 800 may be used to perform various procedures, such as those discussed herein. Computing device 800 can perform various monitoring functions as discussed herein, and can execute one or more application programs, such as the application programs or functionality described herein. Computing device 800 can be any of a wide variety of computing devices, such as a desktop computer, in-dash computer, vehicle control system, a notebook computer, a server computer, a handheld computer, tablet computer and the like.

Computing device 800 includes one or more processor(s) 802, one or more memory device(s) 804, one or more interface(s) 806, one or more mass storage device(s) 808, one or more Input/output (I/O) device(s) 810, and a display device 830 all of which are coupled to a bus 812. Processor(s) 802 include one or more processors or controllers that execute instructions stored in memory device(s) 804 and/or mass storage device(s) 808. Processor(s) 802 may also include various types of computer-readable media, such as cache memory.

Memory device(s) 804 include various computer-readable media, such as volatile memory (e.g., random access memory (RAM) 814) and/or nonvolatile memory (e.g., read-only memory (ROM) 816). Memory device(s) 804 may also include rewritable ROM, such as Flash memory.

Mass storage device(s) 808 include various computer readable media, such as magnetic tapes, magnetic disks, optical disks, solid-state memory (e.g., Flash memory), and so forth. As shown in FIG. 8, a particular mass storage device is a hard disk drive 824. Various drives may also be included in mass storage device(s) 808 to enable reading from and/or writing to the various computer readable media. Mass storage device(s) 808 include removable media 826 and/or non-removable media.

Input/output (I/O) device(s) 810 include various devices that allow data and/or other information to be input to or retrieved from computing device 800. Example I/O device(s) 810 include cursor control devices, keyboards, keypads, microphones, monitors or other display devices, speakers, printers, network interface cards, modems, and the like.

Display device 830 includes any type of device capable of displaying information to one or more users of computing device 800. Examples of display device 830 include a monitor, display terminal, video projection device, and the like.

Interface(s) 806 include various interfaces that allow computing device 800 to interact with other systems, devices, or computing environments. Example interface(s) 806 may include any number of different network interfaces 820, such as interfaces to local area networks (LANs), wide area networks (WANs), wireless networks, and the Internet. Other interface(s) include user interface 818 and peripheral device interface 822. The interface(s) 806 may also include one or more user interface elements 818. The interface(s) 806 may also include one or more peripheral interfaces such as interfaces for printers, pointing devices (mice, track pad, or any suitable user interface now known to those of ordinary skill in the field, or later discovered), keyboards, and the like.

Bus 812 allows processor(s) 802, memory device(s) 804, interface(s) 806, mass storage device(s) 808, and I/O device(s) 810 to communicate with one another, as well as other devices or components coupled to bus 812. Bus 812 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 800 and are executed by processor(s) 802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, if any, any future claims submitted here and in different applications, and their equivalents.

Examples The following examples pertain to further embodiments.

Example 1 is a method for offloading best path computations to a best path controller in a network computing environment. The method includes storing, by a best path controller, a listing of a plurality of paths learnt by a device, wherein the paths are routes for transmitting information from the device to a destination device. The method includes receiving, by the best path controller, a message from the device. The message may be a Network Layer Reachability Information (NLRI) message. The method includes processing, by the best path controller, a best path computation to identify one or more best paths based on the message such that processing of the best path computation is offloaded from the device to the best path controller. The method includes sending the one or more best paths to the device.

Example 2 is a method as in Example 1, wherein the device is a router or a switch.

Example 3 is a method as in any of Examples 1-2, wherein the device is running the Border Gateway Protocol (BGP).

Example 4 is a method as in any of Examples 1-3, further comprising updating next hops for any of the paths in the listing of a plurality of paths based on the one or more best paths calculated by the best path controller.

Example 5 is a method as in any of Examples 1-4, wherein: receiving the message (may be an NLRI message) from the device comprises asynchronously receiving a plurality of messages from the device; and performing the best path computation comprises performing the best path computation on a most recent version of Network Layer Reachability Information (NLRI) based on the plurality of messages.

Example 6 is a method as in any of Examples 1-5, wherein each of the plurality of messages comprises a version number field comprising a unique identification across all messages received from the device for a single NLRI.

Example 7 is a method as in any of Examples 1-6, further comprising: reperforming the best path computation in response to a policy change; generating a result message comprising one or more best paths based on the reperforming the best path computation; and returning the result message to the device.

Example 8 is a method as in any of Examples 1-7, further comprising: receiving, by the best path controller, a next hop reachability update to a path within the listing of a plurality of paths learnt by the device; reperforming the best path computation in response to receiving the next hop reachability update; generating a result message comprising one or more best paths based on the reperforming the best path computation; and returning the result message to the device.

Example 9 is a method as in any of Examples 1-8, further comprising: determining the device has restarted; retaining, by the best path controller, the listing of the plurality of paths learnt by the device; marking each path within the listing of the plurality of paths learnt by the device as stale in response to determining the device has restarted; receiving a refreshed path from the device in response to the device relearning that path; and purging from the listing of the plurality of paths a stale path corresponding with the refreshed path.

Example 10 is a method as in any of Examples 1-9, wherein the best path computation is customized for the device and other devices within the device's network.

Example 11 is a system. The system includes a device in a network, wherein the device is configured to transmit information from the device to a destination device. The system includes a best path controller in communication with the device, the best path controller comprising a processor configurable to execute instructions store in non-transitory computer readable storage media. The instructions include storing in memory a listing of a plurality of paths learnt by the device, wherein each of the plurality of paths is a route for transmitting data from the device to a destination device and receiving a message from the device. The instructions include processing a best path computation to identify one or more best paths based on the message such that processing of the best path computation is offloaded from the device to the best path controller. The instructions include sending the one or more best paths to the device.

Example 12 is a system as in Example 11, wherein the device is a router or a switch, and the device is running the Border Gateway protocol (BGP).

Example 13 is a system as in any of Examples 11-12, wherein the instructions further comprise updating next hops for any of the paths in the listing of a plurality of paths based on the one or more best paths calculated by the best path controller.

Example 14 is a system as in any of Examples 11-13, wherein the instructions are such that: receiving the message from the device comprises asynchronously receiving a plurality of messages from the device; and performing the best path computation comprises performing the best path computation on a most recent version of the plurality of messages.

Example 15 is a system as in any of Examples 11-14, wherein the instructions further comprise: reperforming the best path computation in response to a policy change; generating a result message comprising one or more best paths based on the reperforming the best path computation; and sending the result message back to the device.

Example 16 is non-transitory computer readable storage media storing instructions for execution by one or more processors. The instructions include storing a listing of a plurality of paths learnt by the device, wherein the paths are routes for transmitting information from the device to a destination device. The instructions include receiving a message from the device. The instructions include processing a best path computation to identify one or more best paths based on the message such that processing of the best path computation is offloaded from the device to the best path controller and sending the one or more best paths to the device.

Example 17 is non-transitory computer readable storage media as in Example 16, wherein the instructions further comprise: reperforming the best path computation in response to a policy change; generating a result message comprising one or more best paths based on reperforming the best path computation; and returning the result message to the device.

Example 18 is non-transitory computer readable storage media as in any of Examples 16-17, wherein the instructions further comprise: receiving, by the best path controller, a next hop reachability update to a path within the listing of a plurality of paths learnt by the device; reperforming the best path computation in response to receiving the next hop reachability update; generating a result message comprising one or more best paths based on reperforming the best path computation; and returning the result message to the device.

Example 19 is non-transitory computer readable storage media as in any of Examples 16-18, wherein the instructions further comprise: determining the device has restarted; retaining, by the best path controller, the listing of a plurality of paths (may be a plurality of NLRIs) learnt by the device; marking each path within the listing of a plurality of paths learnt by the device as stale in response to determining the device has restarted; receiving a refreshed path from the device in response to the device relearning that path; and purging from the listing of a plurality of paths a stale path corresponding with the refreshed path.

Example 20 is non-transitory computer readable storage media as in any of Examples 16-19, wherein the best path computation is customized for the device and other devices within the device's network.

It is to be understood that any features of the above-described arrangements, examples, and embodiments may be combined in a single embodiment comprising a combination of features taken from any of the disclosed arrangements, examples, and embodiments.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
   storing in memory, by a best path controller, a listing of a plurality of paths learnt by a device, wherein each of the plurality of paths is a route for transmitting data from the device to a destination device;
   receiving, by a border gateway protocol (BGP) instance executing on a device, a Network Layer Reachability Information (NLRI) message from a neighbor of the device;
   holding, by the BGP instance, the NLRI message in a queue;
   while holding the NLRI message in a queue, forwarding the NLRI message to the best path controller;
   receiving, by the best path controller, the NLRI message from the device;
   processing, by the best path controller, a best path computation to identify one or more best paths based on the NLRI message such that processing of the best path computation is offloaded from the device to the best path controller;
   sending, by the best path controller, the one or more best paths to the device;
   in response to receiving the one or more best paths, dequeuing by the BGP instance, the NLRI message; and
   in response to receiving the one or more best paths, moving, by the BGP instance, the NLRI message to a routing information base (RIB) queue;
   wherein the best path controller comprises a single software package for optimizing the best path computation for either of a switch or a router.

2. The method of claim 1, wherein the best path controller comprises a router or a switch executing the single software package for optimizing the best path computation for each of a plurality of devices in communication with the best path controller.

3. The method of claim 1, wherein the best path controller receives the NLRI message from the device in response to the device determining that the best path controller is currently operational, and wherein of the queue is an out-queue associated with the device that channels toward the best path controller.

4. The method of claim 1, further comprising, in response to receiving the one or more best paths, adding, by the BGP instance, the NLRI message to an update generation queue for announcing to one or more BGP neighbors of the device.

5. The method of claim 1, wherein sending the one or more best paths to the device comprises sending the one or more best paths with a latest version number associated with the NLRI message.

6. The method of claim 1, further comprising sending an unsolicited result message to the device, wherein the unsolicited result message is not sent in response to receiving the NLRI message from the device, and wherein the unsolicited result message comprises a latest version number of the NLRI message.

7. The method of claim 1, further comprising:
   determining the device has restarted;
   retaining, by the best path controller, the listing of the plurality of paths learnt by the device;

marking each path within the listing of the plurality of paths learnt by the device as stale in response to determining the device has restarted;

receiving a refreshed path from the device in response to the device relearning that path; and purging from the listing of the plurality of paths a stale path corresponding with the refreshed path.

8. The method of claim 1, further comprising updating, by the best path controller, next hops for any of the paths in the listing of the plurality of paths based on the one or more best paths calculated by the best path controller.

9. The method of claim 1, further comprising:

receiving, by the best path controller, a next hop reachability update to a path within the listing of the plurality of paths learnt by the device;

reperforming the best path computation in response to receiving the next hop reachability update; and generating a result message comprising the one or more best paths based on the reperforming the best path computation; and sending the result message to the device.

10. A system comprising:

a device in a network configured to:

receive, by a border gateway protocol (BGP) instance executing on a device, a Network Layer Reachability Information (NLRI) message from a neighbor of the device;

hold, by the BGP instance, the NLRI message in a queue; and while holding the NLRI message in a queue, forward the NLRI message to a best path controller in communication with the device; and the best path controller, wherein the best path controller comprises one or more processors for executing instructions stored in non-transitory computer readable storage medium, wherein the instructions comprise a single software package for optimizing best path computations for either of a switch or a router, and wherein the instructions comprise:

storing in memory a listing of a plurality of paths learnt by the device, wherein each of the plurality of paths is a route for transmitting data from the device to a destination device;

receiving the NLRI message from the device;

processing a best path computation to identify one or more best paths based on the NLRI message such that processing of the best path computation is offloaded from the device to the best path controller;

sending the one or more best paths to the device; and in response to receiving the one or more best paths, moving, by the BGP instance, the NLRI message to a routing information base (RIB) queue;

wherein the device is further configured to, de-queue the NLRI message in response to receiving the one or more best paths from the best path controller.

11. The system of claim 10, wherein the best path controller comprises a router or a switch executing the single software package for optimizing the best path computation for each of a plurality of devices in communication with the best path controller.

12. The system of claim 10, wherein the best path controller receives the NLRI message from the device in response to the device determining that the best path controller is currently operational, and wherein the queue is an out-queue associated with the device that channels toward the best path controller.

13. The system of claim 10, wherein the device is further configured to, in response to receiving the one or more best paths, add, by the BGP instance, the NLRI message to an update generation queue for announcing to one or more BGP neighbors of the device.

14. The system of claim 10, wherein the instructions are such that sending the one or more best paths to the device comprises sending the one or more best paths with a latest version number associated with the NLRI message.

15. The system of claim 10, wherein the instructions further comprise sending an unsolicited result message to the device, wherein the unsolicited result message is not sent in response to receiving the NLRI message from the device, and wherein the unsolicited result message comprises a latest version number of the NLRI message.

16. The system of claim 10, wherein the instructions further comprise:

determining the device has restarted;

retaining, by the best path controller, the listing of the plurality of paths learnt by the device;

marking each path within the listing of the plurality of paths learnt by the device as stale in response to determining the device has restarted;

receiving a refreshed path from the device in response to the device relearning that path; and purging from the listing of the plurality of paths a stale path corresponding with the refreshed path.

17. The system of claim 10, wherein the instructions further comprise updating next hops for any of the paths in the listing of the plurality of paths based on the one or more best paths calculated by the best path controller.

18. The system of claim 10, wherein the instructions further comprise:

receiving, by the best path controller, a next hop reachability update to a path within the listing of the plurality of paths learnt by the device;

reperforming the best path computation in response to receiving the next hop reachability update; and generating a result message comprising the one or more best paths based on the reperforming the best path computation; and sending the result message to the device.

* * * * *